(12) United States Patent
Terada

(10) Patent No.: US 7,962,005 B2
(45) Date of Patent: Jun. 14, 2011

(54) IMAGE INFORMATION PROCESSING APPARATUS AND IMAGE INFORMATION PROCESSING PROGRAM

(75) Inventor: Masahiro Terada, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1658 days.

(21) Appl. No.: 11/197,426

(22) Filed: Aug. 5, 2005

(65) Prior Publication Data

US 2006/0034585 A1 Feb. 16, 2006

(30) Foreign Application Priority Data

Aug. 16, 2004 (JP) ................................. 2004-236755

(51) Int. Cl.
*H04N 9/80* (2006.01)
(52) U.S. Cl. ........................................ 386/241; 386/239
(58) Field of Classification Search .................... 386/95, 386/125–126
See application file for complete search history.

(56) References Cited

U.S. PATENT DOCUMENTS

| 6,389,222 | B1 * | 5/2002 | Ando et al. | 386/95 |
| 7,185,175 | B2 * | 2/2007 | Kravec et al. | 712/11 |
| 2005/0111829 | A1 * | 5/2005 | Ito et al. | 386/69 |

FOREIGN PATENT DOCUMENTS

| JP | 2003-123393 A | 4/2003 |
| JP | 2003-233952 A | 8/2003 |
| JP | 2004-064396 | 2/2004 |
| JP | 2004-201170 | 7/2004 |

\* cited by examiner

*Primary Examiner* — Jamie Atala
(74) *Attorney, Agent, or Firm* — Birch, Stewart, Kolasch & Birch, LLP

(57) ABSTRACT

The folder name and the file name of an image file recorded on a recording medium such as a DVD medium, etc. correspond to the title number and the chapter number with which the image of the image file is played back in a slide show recorded on recording medium. Therefore, the slide show can be played back on the playback player such as a DVD player, etc., and an image of a desired image file can be easily detected and confirmed.

16 Claims, 4 Drawing Sheets

FIG.3

| TITLE NUMBER | | |
|---|---|---|
| 1 | CHAPTER | 1→ 2→ 3→ ... 99→ |
| | MOVING PICTURE | (frames) |
| | SUBTITLES | 101-0001  101-0001 101-0002 101-0002  101-0003  ... 101-0099 |
| | ORIGINAL FRAME NUMBER | 100-0001  100-0001 100-0002 100-0002  100-0003  ... 100-0099 |
| 2 | CHAPTER | 1→ 2→ ... 51→ |
| | MOVING PICTURE | (frames) |
| | SUBTITLES | 102-0001  102-0001 102-0002  ... 102-0051 |
| | ORIGINAL FRAME NUMBER | 100-0100  100-0100 100-0101  ... 100-0150 |
| 3 | CHAPTER | 1→ 2→ 3→ ... 60→ |
| | MOVING PICTURE | (frames) |
| | SUBTITLES | 103-0001  103-0001 103-0002 103-0002  103-0003  ... 103-0060 |
| | ORIGINAL FRAME NUMBER | 101-0001  101-0001 101-0002 101-0002  101-0003  ... 101-0060 |

IMAGE INFORMATION PROCESSING APPARATUS AND IMAGE INFORMATION PROCESSING PROGRAM

BACKGROUND OF THE INVENTION

1. Field of the Invention

The present invention related to an image information processing apparatus and an image information processing program, and more specifically to an image information processing apparatus and an image information processing program for editing video information for sequentially playing back in a slide show images taken by a digital camera, etc., recording on a DVD medium the information in a record format in which the images can be played back by a DVD (digital versatile disc) player, etc., and recording on a DVD medium the video information and an image file storing image information about an image to be played back in a slide show.

2. Description of the Related Art

Japanese Patent Application Laid Open No. 2003-123393 discloses editing video information for sequentially playing back, in a slide show, images (static images) of a plurality of image files taken and recorded by a digital camera, recording the video information in a DVD video directory area (VIDEO_TS directory area under the root directory) of a DVD medium in a recording format (hereinafter referred to as a DVD video format) of DVD video (DVD-VIDEO) which can be played back on a DVD player, etc., and recording an image file storing image information about each image to be played back in a slide show in a DCF directory area (DCIM directory area under the root directory) of the same DVD medium in accordance with the DCF (design rule for camera system) standard prescribed as a recording format of a digital camera.

To identify the relationship between each image to be played back in a slide show and each image file storing the image information about each image, it is disclosed that when the video of the slide show is played back on a DVD player, etc., the information designating the recording position of an image file on the DVD medium storing the image information about images to be played back is displayed in combination in video. Furthermore, an image file of images to be played back in a slide show is recorded on a DVD medium in accordance with the DCF standard. Therefore, the folder name recording an image file and the file name information about an image file are not displayed, but the information about a frame number based on the folder name generated in accordance with the naming rule of the DCF standard and the file name are displayed in combination in video, thereby designating the recording position of an image file on a DVD medium, and simplifying the character information to be displayed in combination.

According to the proposition of Japanese Patent Application Laid Open No. 2003-123393, the video in a slide show recorded in the DVD video format on a DVD medium can be played back on a TV monitor by, for example, a DVD player, and the frame number, etc. of a desired image is recorded so that the recording position of an image file storing the image information about the image using the frame number on the DVD medium can be designated, and an image file of a desired image can be designated when a printing order is made, etc. without confirming the contents of the DVD medium using a personal computer or the like.

Japanese Patent Application Laid Open No. 2003-233952 discloses recording moving picture data, static image data, etc. in a DVR directory of a DVD medium in a recording format of a digital video recorder (DVR), recording static image data, etc. in a DCIM directory area of the same DVD medium in the recording format of the DCF, and recording the management information for control of a search and playback of static image data, etc. in a DVR directory area and a DCIM directory area. Thus, equipment in the DVR format and equipment in the DCF standard can regenerate static image data, etc. of a DCIM directory area.

SUMMARY OF THE INVENTION

When the video information in a slide show and an image file of each image to be played back in the slide show are recorded on a DVD medium in the method according to Japanese Patent Application Laid Open No. 2003-123393 above, a user may confirm an image of a specific image file recorded on the DVD medium. In this case, when the video of the slide show of DVD video is played back and the image is to be confirmed, there has been the problem that the user cannot quickly confirm the image because it is necessary to fast forward the images until the desired image in an image file can be played back while checking the frame number, the file name, etc. displayed as combined video display.

On the other hand, as a method of finding the beginning of the frame number of a desired image when video in a slide show is played back, a chapter (delimiter of video) can be set at the playback starting position of an image of each frame. In this method, for example, by specifying the chapter number using a remote controller of a DVD player, etc., the image of a frame number corresponding to the chapter number can be found as the beginning of the image, thereby easily confirming the image of a desired frame number.

However, although a chapter is set corresponding to the video in a slide show of DVD video as described above, the number of chapters to be set in the video of one title is limited to 99 in the provisions of the DVD video format. Therefore, when the number of frame numbers of images to be played back in a slide show is larger than 99, there is the problem that chapters cannot be set for the images of all frame numbers.

Japanese Patent Application Laid Open No. 2003-233952 described above relates to a method for recording an image file and video information together on a DVD medium, and an image file recorded in accordance with the DCF standard is not double recorded in the DVR format in playing back the image of the image file on a DVR-capable playback equipment. However, it cannot be applied when a recording format in which an image of an image file recorded in accordance with the DCF standard such as the DVD video format cannot be played back is used. Furthermore, in the method of Japanese Patent Application Laid Open No. 2003-233952, although an image of a desired image file can be easily confirmed by playing back the image on a DVR-capable playback equipment unit, it is not practical because DVR-capable playback equipment units are not currently widespread.

On the other hand, a playback equipment unit in a DVD video format such as a DVD player, etc. has already been widespread, and it is demanded that an image of a desired image file recorded on a DVD medium can be easily confirmed by playing back video in a slide show without newly introducing a new function to the equipment unit.

The present invention has been developed to solve the above-mentioned problems, and aims at providing an image information processing apparatus and an image information processing program capable of easily confirming an image of a desired image file recorded on a DVD medium in the video in a slide show recorded in a DVD video format.

To attain the above-mentioned objectives, the image information processing apparatus according to the first aspect of the present invention edits video information for sequentially playing back images of a plurality of image file as a slide show, records the video information in a directory area for recording video information of a recording medium in a predetermined format, and records each image file storing image information about each image to be played back in the slide show in an directory area for recording an image file of the recording medium, and includes: a video information edition device which limits the number of images to be sequentially played back in a slide show having one title to a range not exceeding a highest number of chapters of one title prescribed by the predetermined format, edits video information of a slide show of title(s) of one or more title numbers, and sets a chapter at a playback point of each image to be sequentially played back in a slide show;

a video information record device which records video information edited by the video information edition device in the directory area for recording video information of the recording medium; and an image file record device which generates a folder having a folder name corresponding to each title number of a slide show edited by the video information edition device in the directory area for recording an image file of the recording medium, records each image file storing image information about each image to be played back in a slide show of each title number in a folder having a folder name containing a title number of a slide show in which an image of each image file is played back, and records each image file using a file name containing a chapter number of a chapter set at a playback point of an image of each image file by the video information edition device.

According to the first aspect of the present invention, the folder name and the file name of an image file recorded on a recording medium such as a DVD medium, etc. correspond to the title number and the chapter number with which the image of the image file is played back in a slide show recorded on recording medium. Therefore, the slide show can be played back on the playback player such as a DVD player, etc., and an image of a desired image file can be easily detected and confirmed. Especially, when a number input function is used on a remote controller, etc. of a DVD player, a slide show is performed with title numbers by inputting the title numbers corresponding to the folder name of a desired image file, and then an image having a chapter number is played back by selecting the chapter number corresponding to the file name of the image file, thereby easily playing back the image of the desired image file.

The image information processing apparatus according to the second aspect of the present invention is based on the first aspect, and the recording medium is a DVD medium.

The image information processing apparatus according to the third aspect of the present invention is based on the first or second aspect, and when the number of image files selected by a user as image files of images to be played back in a slide show of one title exceeds the highest number of the chapters, the video information edition device divides the selected image file by the number not exceeding the highest number of the chapters as image files of a plurality of titles. The present invention is designed to automatically generate a slide show with a plurality of titles such that the number of images to be sequentially played back in a slide show of one title cannot exceed the highest number of chapters that can be set.

The image information processing apparatus according to the fourth aspect of the present invention is based on the first or second aspect, and the video information edition device sets, as the information about a frame number displayed in combination with images to be sequentially played back in a slide show, the information about the number contained in a folder name of a folder recording an image file of each image and the number contained in a file name of an image file of each image. The present invention displays the number contained in the folder name and the file number contained in the file name as the information about a frame number as the information designating the recording position on a recording medium of an image file of each image when a slide show is performed. Since the numbers contained in the folder name and the file name of each image file correspond to the title number and the chapter number in the slide show in which the image of the image file is played back, the frame number of a desired image can be recorded on a memo when the information is displayed so that the image of the frame number can be confirmed in the slide show by obtaining from the frame number the title number and the chapter number for playback of the image of the frame number.

The image information processing apparatus according to the fifth aspect of the present invention is based on the second aspect, and the predetermined format in which video information is recorded on a DVD medium is a DVD video format.

The image information processing apparatus according to the sixth aspect of the present invention is based on the first aspect, and the image file record device records an image file of each image to be played back in a slide show in a directory area for recording an image file of the recording medium in accordance with a DCF standard, and a folder name corresponding to each title number when a folder is generated has a value of lower two digits in a three-digit folder number prescribed in a naming rule of a folder name in the DCF standard matching each title number. The present invention uses the DCF standard as a recording format in which an image file is recorded on a recording medium, and the DCF standard prescribes a three-digit folder number of 100 or more as a folder name of a DCF folder storing an image file. The value of lower two digits is set to match the title number.

The image information processing program according to the seventh aspect of the present invention edits video information for sequentially playing back images of a plurality of image file as a slide show, records the video information in a directory area for recording video information of a recording medium in a predetermined format, and records each image file storing image information about each image to be played back in the slide show in an directory area for recording an image file of the recording medium, and includes: a video information edition function which limits the number of images to be sequentially played back in a slide show having one title to a range not exceeding a highest number of chapters of one title prescribed by the predetermined format, edits video information of a slide show of title(s) of one or more title numbers, and sets a chapter at a playback point of each image to be sequentially played back in a slide show; a video information record function which records video information edited by the video information edition function in the directory area for recording video information of the recording medium; and an image file record function which generates a folder having a folder name corresponding to each title number of a slide show edited by the video information edition function in the directory area for recording an image file of the recording medium, records each image file storing image information about each image to be played back in a slide show of each title number in a folder having a folder name corresponding to a title number of a slide show in which an image of each image file is played back, and records each image file using a file name corresponding to a chapter number of a chapter set at a playback point of an image of each image file by the video information edition function. The present invention relates to a program for executing each process performed by the image information processing apparatus according to the first aspect of the invention.

The image information processing program according to the eighth aspect of the present invention is based on the seventh aspect, and the recording medium is a DVD medium. The present invention relates to the program for executing each process performed by the image information processing apparatus according to the second aspect of the invention.

The image information processing program according to the ninth aspect of the present invention is based on the seventh or eighth aspect, and when a number of image files selected by a user as image files of images to be played back in a slide show of one title exceeds the highest number of the chapters, the video information edition function divides the selected image file by a number not exceeding the highest number of the chapters as image files of a plurality of titles. The present invention relates to the program for executing each process performed by the image information processing apparatus according to the third aspect of the invention.

The image information processing program according to the tenth aspect of the present invention is based on the seventh or eighth aspect, and the video information edition function sets information about a number contained in a folder name of a folder recording an image file of each image as information about a frame number displayed in combination with images to be sequentially played back in a slide show, and a number contained in a file name of an image file of each image. The present invention relates to the program for executing each process performed by the image information processing apparatus according to the fourth aspect of the invention.

The image information processing program according to the eleventh aspect of the present invention is based on the eighth aspect, and the predetermined format in which video information is recorded on a DVD medium is a DVD video format. The present invention relates to the program for executing each process performed by the image information processing apparatus according to the fifth aspect of the invention.

The image information processing program according to the twelfth aspect of the present invention is based on the seventh or eighth aspect, and the image file record function records an image file of each image to be played back in a slide show in a directory area for recording an image file of the recording medium in accordance with a DCF standard, and a folder name corresponding to each title number when a folder is generated has a value of lower two digits in a three-digit folder number prescribed in a naming rule of a folder name in the DCF standard matching each title number. The present invention relates to the program for executing each process performed by the image information processing apparatus according to the sixth aspect of the invention.

According to the present invention, an image of a desired image file recorded on a DVD medium can be easily confirmed by the video in a slide show recorded in a DVD video format.

BRIEF DESCRIPTION OF THE DRAWINGS

FIG. 3 is a view for explanation of editing a slide show; and

DETAILED DESCRIPTION OF THE PREFERRED EMBODIMENTS

The best mode for carrying out the present invention is explained below in detail by referring to the attached drawings.

Figure 1:
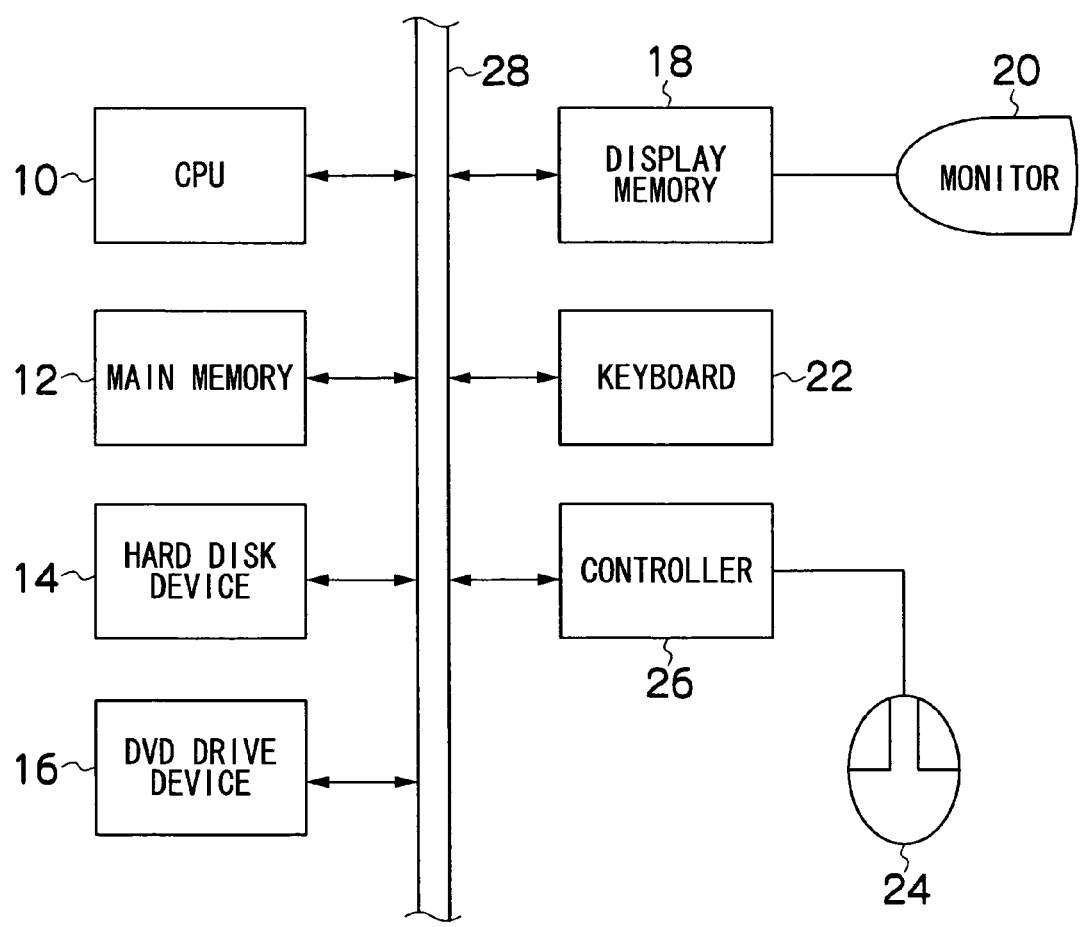
FIG. 1 is a block diagram of the hardware configuration of a personal computer for executing the image information processing program according to the present invention.

FIG. 1 is a block diagram showing an example of the hardware configuration of a personal computer for executing the image information processing program according to the present invention. As shown in FIG. 1, a personal computer comprises: a central processing unit (CPU) 10 for mainly controlling the operation of each component; main memory 12 for storing a control program of a device and functioning as a work area when a program is executed; a hard disk device 14 for storing an operating system (OS) of a personal computer, the image information processing program according to the present invention, various types of application software, an image file, etc. of a user; a DVD drive device 16; display memory 18 for temporarily storing display data; a monitor device 20 such as a CRT monitor, a liquid crystal monitor, etc. for displaying an image, a character, etc. using image data, character data, etc. from the display memory 18; a keyboard 22; a mouse 24 as a position input device; a mouse controller 26 for detecting the status of the mouse 24 and outputting to the CPU 10 a signal of the position of the mouse pointer on the monitor device 20 and the status of the mouse 24, etc.; and a bus 28 for connection of each of the above-mentioned components.

The personal computer with the above-mentioned configuration is well known except the image information processing program stored in the hard disk device 14. Therefore, the detailed explanation of each component is omitted here.

Explained below is the process performed by the image information processing program according to the present invention.

The image information processing program directs the personal computer to perform the following process. First, when a user selects an image file stored in the hard disk device 14, it edits video information for sequentially playing back an image of the selected image file for a predetermined time in a slide show. The video information is stored in a file in the DVD video (DVD-VIDEO) format, and writes it in a recording structure according to the DVD video format on a DVD medium, on which data can be written, such as DVD-R, DVD-RS, etc. inserted into the DVD drive device 16.

On the same DVD medium recording the video information about the slide show in the DVD video format, an image file storing image information about an image played back in the slide show is written in a recording structure according to the DCF (design rule for camera system) standard with the file name appropriately changed according to the DCF standard.

Figure 2:
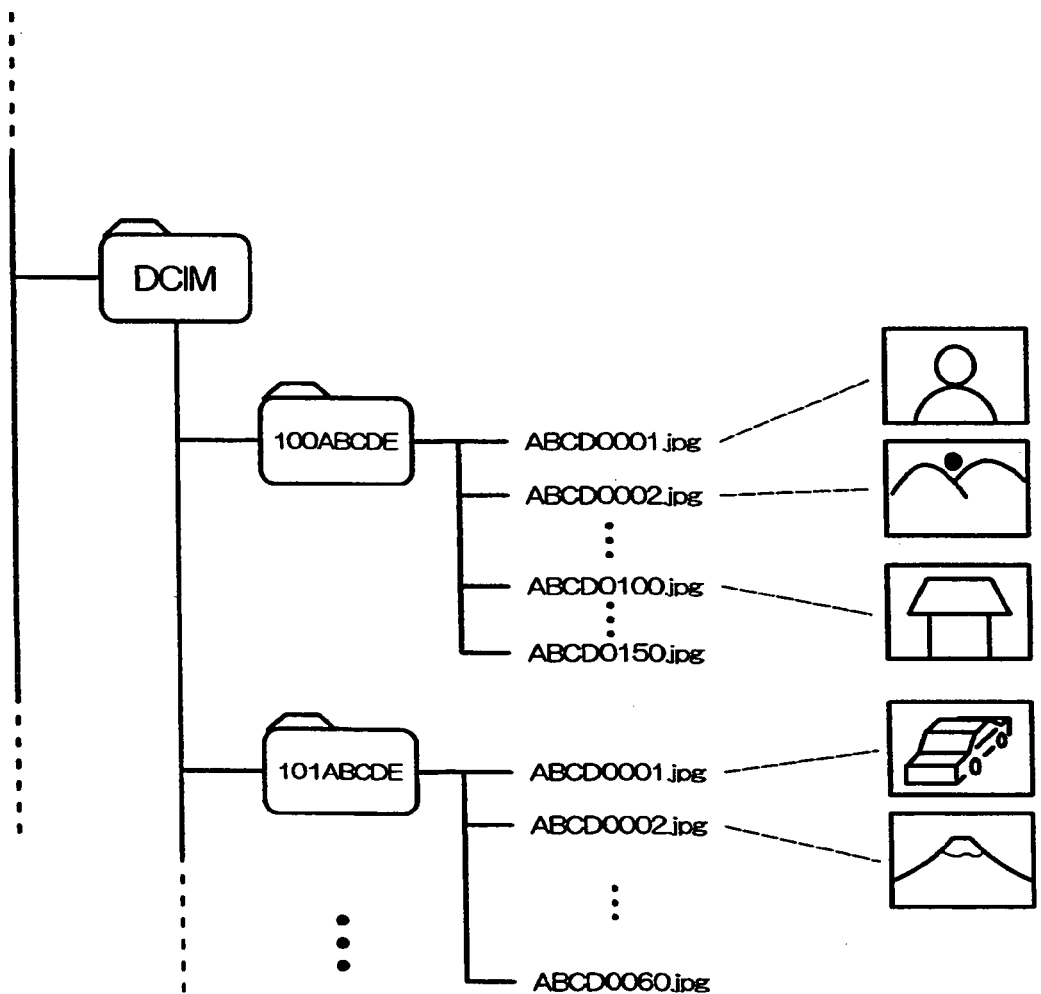
FIG. 2 shows an example of a recording structure of an image file recorded in a DCF standard on the hard disk device of the personal computer.

The above-mentioned process is explained below in detail by referring to a practical example. That is, it is assumed that the hard disk device 14 of the personal computer stores a plurality of image files taken by a digital camera, etc. as shown in FIG. 2 and read by the personal computer in a recording structure according to the DCF standard. According to the DCF standard, a "DCIM" folder is generated as the highest directory (folder), and immediately below it, DCF folder having an equal hierarchical level (100ABCDE, 101ABCDE, . . . ) are generated according to a predetermined naming rule. Then, the image files according to the predetermined naming rule are put in each DC offset.

First described is the naming rule of the DCF folder and the image file according to the DCF standard. That is, a folder name of a DCF folder is formed by a three-digit folder number from 100 to 999 followed by five optional characters. For example, in the folder "100ABCDE" of the DCF folder shown in FIG. 2, "100" is a folder number, and "ABCDE" are optional characters. The folder number is defined as a number of 100 or more.

The file name of an image file in each DCF folder is formed by four optional characters followed by a four-digit file number from 0001 to 9999. For example, in the file "ABCD0001.jpg" in the folder "100ABCDE" shown in FIG. 1, "ABCD" are optional characters, and "0001" is a file number.

As the identification information for identification of an image file (or its image) in each DCF folder, the identification information about, for example, the file "ABCD0001.jpg" in the folder "100ABCDE" is expressed by 100-0001 using the folder number of the DCF folder and the file number of the file name. The identification information is referred to as a frame number.

Next, from the image file stored in the hard disk device 14, a user selects an image file of an image to be displayed in a slide show. There are some methods in which a user selects an image file. For example, a desired image file in a DCF folder can be individually selected, or can be selected in a DCF folder unit.

The method of selecting an image file in a DCF folder unit is explained below. That is, when a user selects one desired DCF folder, all image files in the DCF folder are selected as an image file (for generation of a slide show) of images to be displayed in a slide show.

In the DVD video format, video can be played back by title. When a plurality of DCF folders are selected, they are selected for generating a slide show having a different title number for each DCF folder.

For example, assume that the folders "100ABCDE" and "101ABCDE" are selected from among the DCF folders shown in FIG. 2. In this case, the image file in the folder "100ABCDE" and the image file in the folder "101ABCDE" are selected as image files for slide shows having different title numbers.

As a method of a user selecting an image file for generation of a slide show, it is possible to individually select an image file for each title number of a slide show to be generated, or possible to select images of image files in a plurality of DCF folders as images to be sequentially played back in a slide show having the same title number when the plurality of DCF folders are selected.

When an image file is selected, the selected file is not limited to a file recorded on the hard disk device 14. That is, when a personal computer can fetch data from a recording medium such as a memory card used in a digital camera, an image file stored on the recording medium can be directly selected. Furthermore, it is not limited to an image file recorded in a recording structure according to the DCF standard as shown in FIG. 2. Although an image file is recorded with any file name in a folder having any folder name, the folder can be selected or an image file in the folder can be individually selected.

In the DVD video format, a chapter (or a chapter point) can be set as a mark to delimit a series of video images, and a chapter is set at a position where an image is switched to an image of a different image file in a slide show. However, in the DVD video format, the number of chapters that can be set in the video of one title is limited, and the highest number is 99. Therefore, in the image information processing program according to the present invention, the number of image files that can be selected in a slide show of one title is limited to 99.

There are a number of methods of limiting the number of image files selected in a slide show of one title to 99, that is, the highest number of chapters depending on the method of selecting an image file. For example, as described above, when a user select an image file in a DCF folder unit, and when there are more than 100 image files selected by a user in any DCF folder, there can be a case where there are 99 or less image files are automatically divided for slide shows as having different title numbers in one DCF folder. In this method, when the folder "100ABCDE" shown in FIG. 2 is selected, there are 150 image files "ABCD0001.jpg" to "ABCD0150.jpg" in the folder "100ABCDE" having the file numbers 0001 to 0150 (frame numbers 100-0001 to 100-0150). These image files are divided into 99 image files "ABCD0001.jpg" to "ABCD0099.jpg" having file numbers 0001 to 0099 (frame numbers 100-0001 to 100-0099), and 51 image files "ABCD0100.jpg" to "ABCD0150.jpg" having file numbers 0100 to 0150 (frame number 100-0100 to 100-0150). The former files are selected as image files for the slide show having the title number 1, and the latter files are selected as image files for the slide show having the title number 2. However, when one folder of image files is divided, it is not limited to the case in which image files are delimited and divided into groups having the highest number of chapters of 99. For example, when the image files are divided by the number of 99 or less, the image file can be divided such that substantially equal number of image files can be assigned for the minimal number of titles. In the above-mentioned example, 150 image files are equally divided into two, and 75 image files are assigned to each group.

In another method used when a user selects image files in a DCF folder unit, and when image files are individually selected, when the number of image files of a DCF folder selected by a user for a slide show of one title exceeds the highest number of chapters, or when the number of individually selected image files exceeds the highest number of chapters, the user is notified of the information to reselect the image file such that the number of image files to be selected for a slide show of one title cannot exceed the highest number of chapters, or the image files are selected up to the highest number of chapters, and any more image files selected for the slide show of the same title is rejected.

As described above, when a user selects image files for generating a slide show, the video information for the slide show in which images of the selected image files are sequentially played back for a predetermined time is edited for DVD video. In the DCF folders shown in FIG. 2, if the user selects the folder "100ABCDE" and the folder "101ABCDE" for generating the slide shows having different title numbers, the slide shows are edited as shown in FIG. 3.

First, the 150 image files "ABCD0001.jpg" to "ABCD0150.jpg" having the file numbers 0001 to 0150 (frame numbers 100-0001 to 100-0150) in the folder "100ABCDE" are divided into the 99 image files "ABCD0001.jpg" to "ABCD0099.jpg" having the file numbers 0001 to 0099 (frame numbers 100-0001 to 100-0099), and the 51 image files "ABCD0100.jpg" to "ABCD0150.jpg" having the file numbers 0100 to 0150 (frame numbers 100-0100 to 100-0150). Then, the image files "ABCD0001.jpg" to "ABCD0099.jpg" are selected as the image files for generating a slide show having the title number 1, and the image files "ABCD0100.jpg" to "ABCD0150.jpg" are selected as image files for generating the slide show having the title number 2. On the other hand, the 60 image files "ABCD0001.jpg" to "ABCD0060.jpg" having the file numbers 0001 to 0060

(frame numbers 101-0001 to 101-0060) of the folder "101ABCDE" are selected as the image files for generating a slide show having the title number 3.

From the image files selected for generating the slide shows having the respective title numbers 1, 2, and 3, moving picture data for slide shows for sequential playback for a predetermined time in the order of the file number is generated. It is also possible to optionally change the playback order. On the display column of the slide show having the respective title numbers 1, 2, and 3 shown in FIG. 3 shows the images to be sequentially played back by the moving picture data of the slide show of each title number. For example, in the moving picture data of the slide show having the title number 1, the image of the image file "ABCD0001.jpg" in the folder "100ABCDE" is first played back continuously for a predetermined time. Then the image file "ABCD0001.jpg" in the folder "100ABCDE" is continuously played back for a predetermined time. Images of each image file are displayed in two frame units to indicate that each image is played back continuously for a predetermined time. On the display column of the slide show of each title number, the "original frame number" shown at the bottom is the frame number of the image file which is the source of the image of each frame of moving picture data, that is, in the hard disk device 14, the frame number based on the folder number of the DCF folder recording the image file of each image and the file number of the image file. Thus, moving picture data for sequentially and continuously playing back the images for a predetermined time from the image file "ABCD0001.jpg" to "ABCD0099.jpg" in the folder "100ABCDE" (frame numbers 100-0001 to 100-0099) are generated.

In the moving picture data of the slide show having the title number 2, the images of the image file "ABCD0100.jpg" in the folder "100ABCDE" are first continuously played back for a predetermined time, and the images of the image file "ABCD0101.jpg" in the folder "100ABCDE" are continuously played back for a predetermined time. Thus, the moving picture data for sequentially and continuously playing back images for a predetermined time from the image file "ABCD0100.jpg" to "ABCD0150.jpg" (frame numbers 100-0100 to 100-0150) in the folder "100ABCDE" is generated.

In the moving picture data of the slide show having the title number 3, the images of the image file "ABCD0001.jpg" in the folder "101ABCDE" are first continuously played back for a predetermined time, and then the images of the image file "ABCD0002.jpg" in the folder "101ABCDE" are continuously played back for a predetermined time. Thus, moving picture data for sequential and continuous playback of images of the image files "ABCD0001.jpg" to "ABCD0060.jpg" (frame numbers 101-0001 to 101-0060) in the folder "101ABCDE" is generated.

For the moving picture data of the slide shows having the title numbers 1, 2, and 3, chapters are assigned chapter numbers sequentially from the chapter number 1 as delimiting marks of images at the starting position of the image of the first frame and the position at which the image is switched to the image of a different image file. For example, since in the slide show having the title number 1, the number of images to be sequentially played back is 99, the chapter numbers 1 to 99 are set.

Furthermore, detailed explanation is given later, but the image files used in generating a slide show having each title number, that is, the image file of the folder "100ABCDE" shown in FIG. 2, and the image file of the folder "100ABCDE" are recorded on the DVD medium according to the DCF standard with the folder structure and the file name appropriately changed. Then, for the moving picture data of the slide shows having the title numbers 1, 2, and 3, the information about the frame number on the DVD medium of each image to be sequentially played back, that is, the information about the frame number based on the folder number of the DCF folder recording the image file of each image on the DVD medium and the file number of the image file is set as subtitles data. For example, as shown in FIG. 3, the frame numbers of the images sequentially played back in the moving picture data in the slide show having the title number 1 are 101-0001 to 101-0099, and the information is set as subtitles data. The frame numbers of the images sequentially played back in the moving picture data in the slide show having the title number 2 are 102-0001 to 102-0051, and the information is set as subtitles data. The frame numbers of the images sequentially played back in the moving picture data in the slide show having the title number 3 are 103-0001 to 103-0060, and the information is set as subtitles data. Thus, in the frame number displayed in combination with each image in the slide show as subtitles, the lower order two digits in the higher order three digits indicating the folder number matched the title number of the slide show in which the images corresponding to the frame number are played back, and the lower order four digits indicates the order in the frames from the start of the slide show, that is, match the chapter number.

As described above, when the video information about the slide show having each title number is edited, the video information is put in a file according to the DVD video format, and is written in the recording structure according to the DVD video format on the DVD medium. The image file used in generating a slide show of each title number is written to the DVD medium according to the DCF standard.

Figure 4:
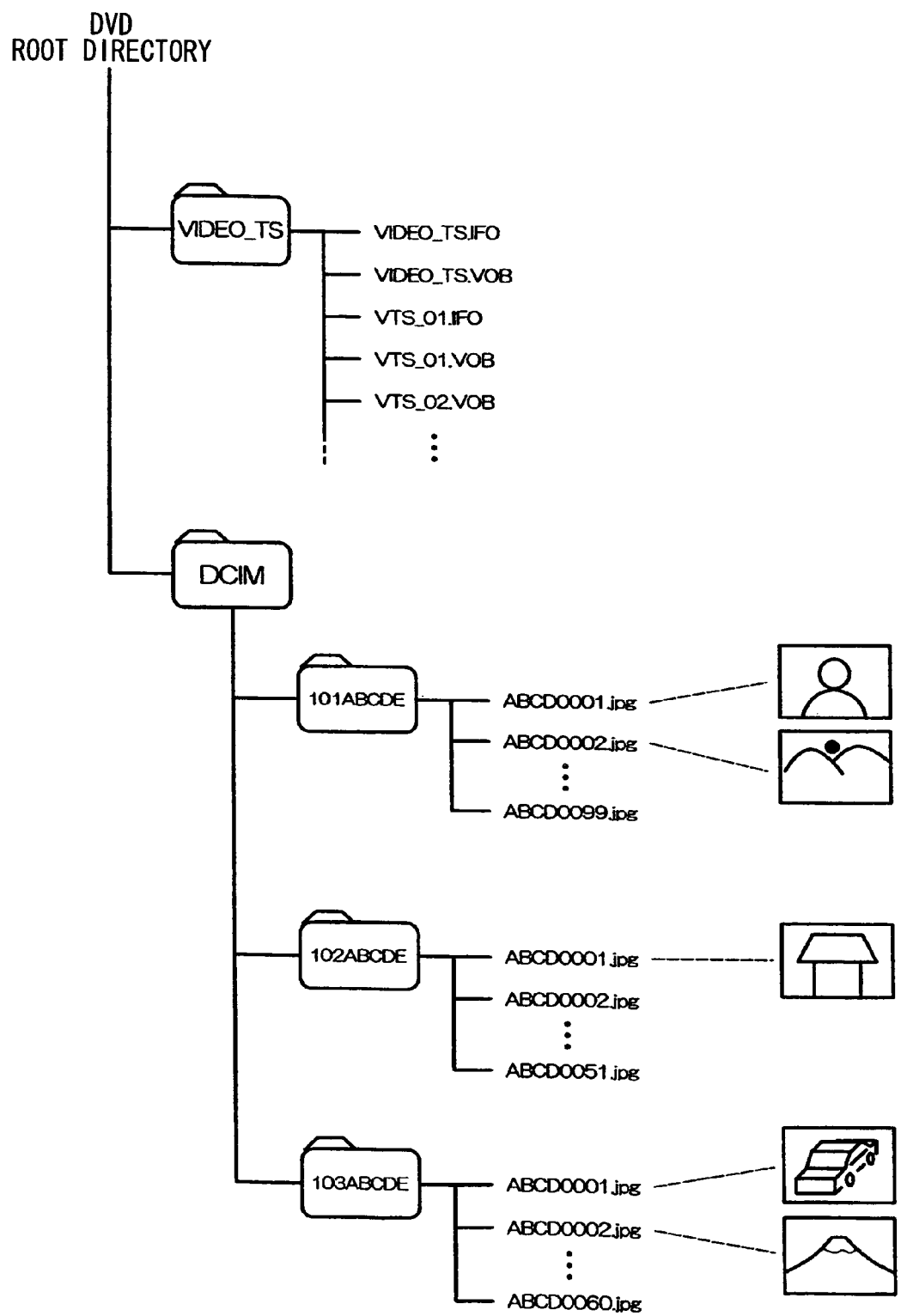
FIG. 4 shows the configuration of a folder and a file generated on a DVD medium.

FIG. 4 shows the folder and file generated on the DVD medium when the video information about the slide show edited as shown in FIG. 3 and the image file used in generating a slide show are recorded on the DVD medium. As shown in FIG. 4, the folder "VIDEO_TS" (directory area for DVD video) for recording the file about the video information about the slide show in the DVD video format immediately below the root directory of the DVD medium is generated. In the folder "VIDEO_TS", the file for playback of moving picture data of the slide show having the title numbers 1, 2, and 3 edited as shown in FIG. 3, the file for playing back the settings about the title, chapter, subtitles, etc. are recorded. For example, the file "VIDEO_TS.INF", the file "VIDEO_TS.VOB", the file "VTS_01.IFO", the file "VTS_01.VOB", etc. named according to the provisions of the DVD video format are recorded.

On the other hand, the highest order folder "DCIM" (directory area for DCF) in the DCF standard is generated immediately below the root directory of the DVD medium for recording an image file used in generating a slide show according to the DCF standard. A DCF folder is generated for the "DCIM" folder, and an image file is recorded below each DCF folder. As for DCF folders, the number of folders to be generated is equal to the number of the titles in the slide show for playback on DVD video. The lower order two digits of the folder number match the title number. When the slide show having three title numbers 1, 2, and 3 is generated as shown in FIG. 3, the folder "101ABCDE", the folder "102ABCDE", and the folder "103ABCDE" are generated as the DCF folders as shown in FIG. 4. In each DCF folder, the image file used in generating a slide show of each title number is recorded after being changed to the file name of the file number assigned in the order of playback in the slide show. That is, it is changed to a file name to obtain the file number matching the chapter number in the slide show. For example, the images of the 99 image files "ABCD0001.jpg" to "ABCD0099.jpg" recorded in the folder "100ABCDE" of the hard disk device 14 shown in FIG. 2 are sequentially played back in the slide show having the title number 1. Therefore, on the DVD medium, the image files having the file names "ABCD0001.jpg" to "ABCD0099.jpg" are recorded in the folder "101ABCDE".

Since the images of the 51 image files "ABCD0100.jpg" to "ABCD0150.jpg" recorded on the folder "100ABCDE" of the hard disk device 14 shown in FIG. 2 are sequentially played back in the slide show having the title number 2, they are recorded on the DVD medium as the image files having the file names "ABCD0001.jpg" to "ABCD0051.jpg" in the folder "102ABCDE".

Since the images of the 60 image files "ABCD0001.jpg" to "ABCD0060.jpg" recorded in the folder "101ABCDE" of the hard disk device 14 are played back in order in the slide show having the title number 3 as shown in FIG. 2, they are recorded on the DVD medium as the image files having the file names "ABCD0001.jpg" to "ABCD0060.jpg" in the folder "103ABCDE".

Thus, when the generated DVD medium is played back on the DVD-video-capable DVD player, etc., the menu screen for selection of a title number is displayed. When the title number to be played back is selected using, for example, a remote controller, the playback of the slide show having the title number is started. If a chapter number is input using a remote controller after starting the playback of the slide show, control is passed to the chapter, and the image of the chapter is played back. The chapter menu can be displayed to direct the playback from a desired chapter number on the menu screen.

When the slide show is played back on the DVD medium in the above-mentioned operation, for example, it is easy to regenerate an image of a desired frame number, or regenerate an image of a desired image file recorded on a DVD medium. Assuming that the video information and the image file of the slide show edited as shown in FIG. 3 are recorded on the DVD medium, for example, when an image of the frame number 101-0010 is to be played back, a user first selects as a title number two lower order digits 01 (or 1 simply) of the higher three digits 101 of the frame number, that is, the folder number, to start the playback of the slide show of the title number 1. Then a user selects as a chapter number the four lower digits 0010 (or 10 simply) of the frame number, that is, the file number, and the video of the slide show is switched to the chapter point of the chapter number 10, thereby playing back the image of the frame number 101-0010.

Furthermore, using the DVD medium generated as described above, it is easy to make an order of print for a desired image confirmed by playing back a slide show. For example, by playing back a slide show and confirming an image to be printed, the frame number of the image displayed as subtitles is taken down on a memo. Then, without confirming the data on the DVD medium using a personal computer, etc. the DVD medium is sent to the photo shop with the frame number on the memo specified, thereby easily making an order of printing.

In the above-mentioned embodiment, the folder number of the DCF folder and the frame number based on the file number ("folder number"-"file number") when image file is recorded according to the DCF standard on the DVD medium are used as a frame number when displayed in combination as video in a slide show. The folder number can be replaced with a title number for display as a frame number. For example, when data is edited as shown in FIG. 3, the frame number of 101-0001 displayed as subtitles can also be 01-0001. In addition, the image file is not recorded on a DVD medium according to the DCF standard, but can be recorded in the folder having the folder name assigned the number completely matching the title number of the slide show. For example, the image file used in generating a slide show having the title number 1 can be recorded in the folder "01" or the folder "01XXX" (X is an optional character), etc. generated under the folder of the folder "DCIM" or other folder name directly below the root directory of a DVD medium. In this case, when the frame number is formed by a folder number and a file number ("folder number"-"file number"), the frame number completely matches the title number and the chapter number for playback in a slide show of the images of the frame number.

In the above-mentioned embodiment, the video information of a slide show is recorded on the DVD medium according to the DVD video format, but the present invention is not limited to this application, but the present invention can be applied to the case in which the video information about a slide show is recorded in another recording format (application format), for example, a DVD Video Recording format, etc. Furthermore, the present invention can be applied when the video information about a slide show is recorded in a predetermined format on other recording media such as CD media, blue-ray disk media, etc. not limited to the DVD media.

What is claimed is:

1. An image information processing apparatus which edits video information for sequentially playing back images of a plurality of image files for a predetermined time as a slide show, records the video information in a directory area for recording video information of a recording medium in a predetermined format, and records each image file storing image information about each image to be played back in the slide show in a directory area for recording an image file of the recording medium, comprising:
   a video information edition device which limits a number of images to be sequentially played back in a slide show having one title to a range not exceeding a highest number of chapters of one title prescribed by the predetermined format, edits video information of a slide show of title(s) of one or more title numbers, and sets a chapter at a playback starting position of each image to be sequentially played back in a slide show;
   a video information record device which records video information edited by the video information edition device in the directory area for recording video information of the recording medium; and
   an image file record device which generates a folder having a folder name corresponding to each title number of a slide show edited by the video information edition device in the directory area for recording an image file of the recording medium, records each image file storing image information about each image to be played back in a slide show of each title number in a folder having a folder name containing a title number of a slide show in which an image of each image file is played back, and records each image file using a file name containing a chapter number of a chapter set at a playback point of an image of each image file by the video information edition device,
   wherein video can be played back by title.

2. The image information processing apparatus according to claim 1, wherein
   the recording medium is a DVD medium.

3. The image information processing apparatus according to claim 1, wherein
when a number of image files selected by a user as image files of images to be played back in a slide show of one title exceeds the highest number of the chapters, the video information edition device divides the selected image file by a number not exceeding the highest number of the chapters as image files of a plurality of titles.

4. The image information processing apparatus according to claim 1, wherein
the video information edition device sets, as information about a frame number displayed in combination with images to be sequentially played back in a slide show, information about a number contained in a folder name of a folder recording an image file of each image and a number contained in a file name of an image file of each image.

5. The image information processing apparatus according to claim 2, wherein
the predetermined format in which video information is recorded on a DVD medium is a DVD video format.

6. The image information processing apparatus according to claim 1, wherein
the image file record device records an image file of each image to be played back in a slide show in a directory area for recording an image file of the recording medium in accordance with a DCF standard, and a folder name corresponding to each title number when a folder is generated has a value of lower two digits in a three-digit folder number prescribed in a naming rule of a folder name in the DCF standard matching each title number.

7. A non-transitory computer readable recording medium storing an image information processing program which edits video information for sequentially playing back images of a plurality of image files for a predetermined time as a slide show, records the video information in a directory area for recording video information of a recording medium in a predetermined format, and records each image file storing image information about each image to be played back in the slide show in a directory area for recording an image file of the recording medium, comprising:
a video information edition function which limits a number of images to be sequentially played back in a slide show having one title to a range not exceeding a highest number of chapters of one title prescribed by the predetermined format, edits video information of a slide show of title(s) of one or more title numbers, and sets a chapter at a playback starting position of each image to be sequentially played back in a slide show;
a video information record function which records video information edited by the video information edition function in the directory area for recording video information of the recording medium; and
an image file record function which generates a folder having a folder name corresponding to each title number of a slide show edited by the video information edition function in the directory area for recording an image file of the recording medium, records each image file storing image information about each image to be played back in a slide show of each title number in a folder having a folder name corresponding to a title number of a slide show in which an image of each image file is played back, and records each image file using a file name corresponding to a chapter number of a chapter set at a playback point of an image of each image file by the video information edition function,
wherein video can be played back by title.

8. The non-transitory computer readable recording medium storing an image information processing program according to claim 7, wherein
the recording medium is a DVD medium.

9. The non-transitory computer readable recording medium storing an image information processing program according to claim 7, wherein
when a number of image files selected by a user as image files of images to be played back in a slide show of one title exceeds the highest number of the chapters, the video information edition function divides the selected image file by a number not exceeding the highest number of the chapters as image files of a plurality of titles.

10. The non-transitory computer readable recording medium storing an image information processing program according to claim 7, wherein
the video information edition function sets information about a number contained in a folder name of a folder recording an image file of each image as information about a frame number displayed in combination with images to be sequentially played back in a slide show, and a number contained in a file name of an image file of each image.

11. The non-transitory computer readable recording medium storing an image information processing program according to claim 8, wherein
the predetermined format in which video information is recorded on a DVD medium is a DVD video format.

12. The non-transitory computer readable recording medium storing an image information processing program according to claim 7, wherein
the image file record function records an image file of each image to be played back in a slide show in a directory area for recording an image file of the recording medium in accordance with a DCF standard, and a folder name corresponding to each title number when a folder is generated has a value of lower two digits in a three-digit folder number prescribed in a naming rule of a folder name in the DCF standard matching each title number.

13. The image information processing apparatus, according to claim 1, wherein
a chapter is used as a cue from which a frame corresponding to the chapter in the slide show is played.

14. The image information processing apparatus according to claim 1, wherein
file names of all image files contain corresponding chapter numbers, and
the chapter numbers are assigned to all the image files recorded in the recording medium.

15. The non-transitory computer readable recording, medium storing an information processing program according to claim 7, wherein
a chapter is used as a cue from which a frame corresponding to the chapter in the slide show is played.

16. The non-transitory computer readable recording medium storing an information processing program according to claim 7, wherein
file names of all image files contain corresponding chapter numbers, and
the chapter numbers are assigned to all the image files recorded in the recording medium.

* * * * *